Sept. 6, 1955  C. W. MURRAY  2,717,142
SCALES FOR THE WEIGHING OF LIQUIDS
Filed June 21, 1951  4 Sheets-Sheet 1

C. W. Murray
INVENTOR.

BY
Mason, Porter, Miller & Stewart
Attorneys

Sept. 6, 1955      C. W. MURRAY      2,717,142

SCALES FOR THE WEIGHING OF LIQUIDS

Filed June 21, 1951      4 Sheets-Sheet 2

C. W. Murray
INVENTOR.

BY Mason, Porter, Diller & Stewart
Attorneys

Sept. 6, 1955  C. W. MURRAY  2,717,142
SCALES FOR THE WEIGHING OF LIQUIDS
Filed June 21, 1951  4 Sheets-Sheet 3
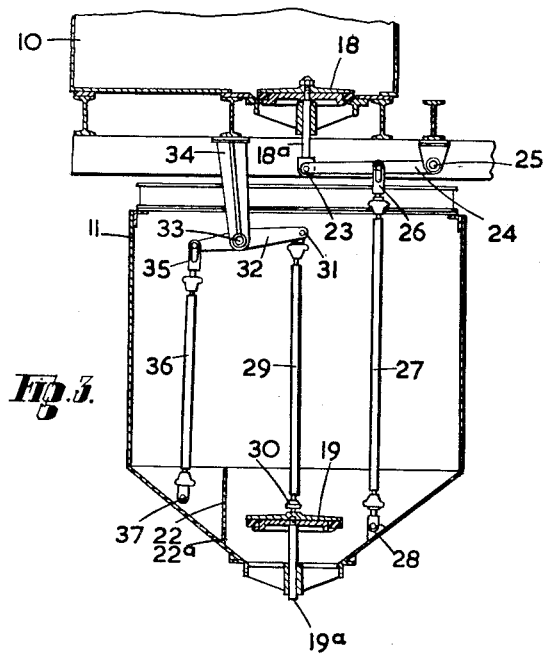
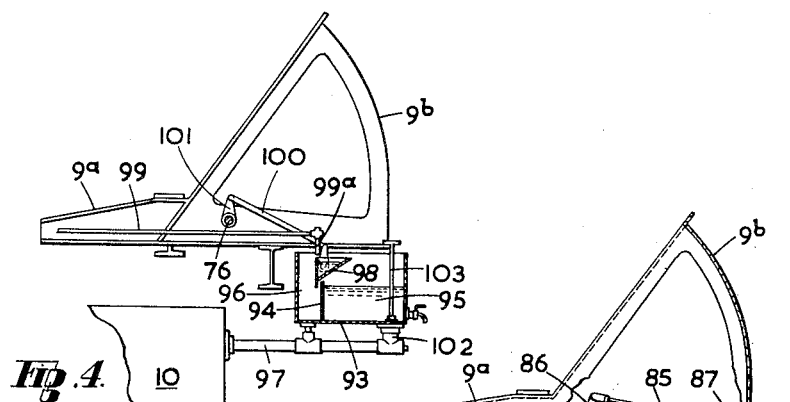
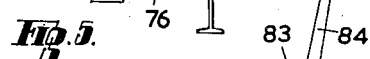
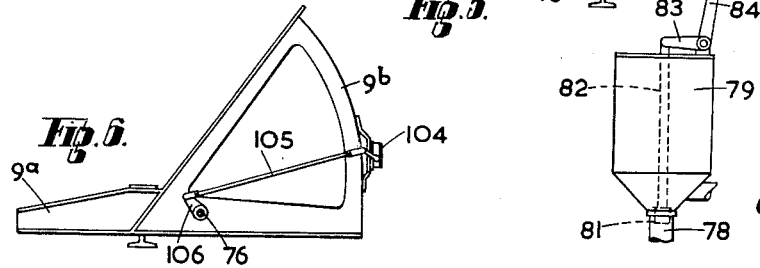
C. W. Murray
INVENTOR.
BY Mason, Porter, Miller & Stewart
Attorneys Sept. 6, 1955  C. W. MURRAY  2,717,142
SCALES FOR THE WEIGHING OF LIQUIDS
Filed June 21, 1951  4 Sheets-Sheet 4
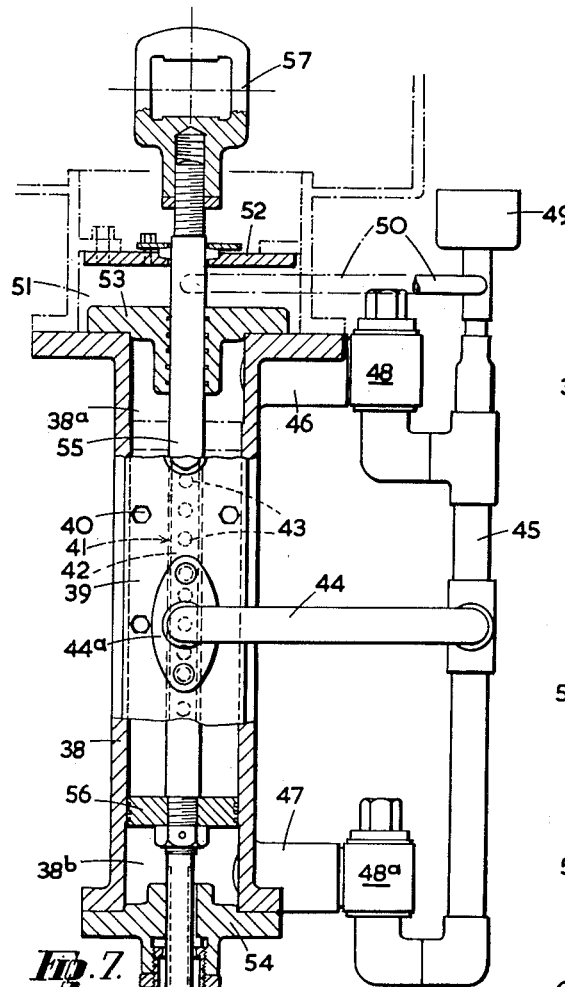
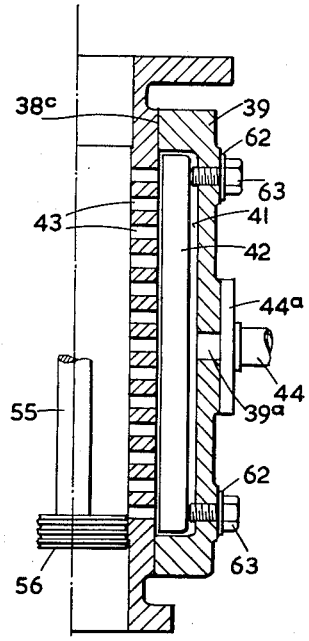
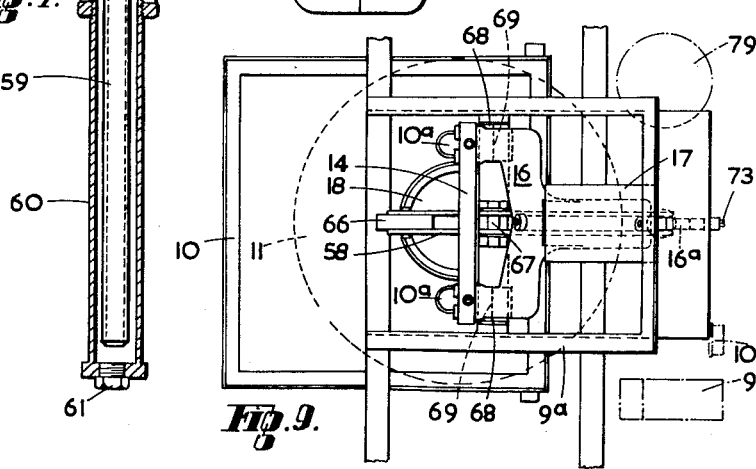
INVENTOR.

United States Patent Office 2,717,142
Patented Sept. 6, 1955

2,717,142

SCALES FOR THE WEIGHING OF LIQUIDS

Cecil Walter Murray, Holly Bank, Repton, England, assignor to George Fletcher & Co. Limited, Derby, England, a British company Application June 21, 1951, Serial No. 232,698

Claims priority, application Great Britain August 2, 1950

28 Claims. (Cl. 249—3)

The present invention relates to scales for the weighing of liquids and is particularly concerned with liquid weighing scales such as are used in the sugar industry for the weighing of sugar liquors, and of the type in which a weigh tank is suspended from a counterweighted main balance lever or weigh beam and in which the opening and closing of a delivery valve to the weigh tank and a discharge valve therefrom are effected by the up and down movement of the weigh tank. Such scales are usually provided with a supply tank supported by the frame of the scale immediately above the weigh tank, and the delivery valve to the weigh tank is arranged in the bottom of the supply tank and controlled by movement of the weigh beam of the weigh tank.

A particular form of such scale already widely in use is known as the Maxwell-Boulogne vertical molasses scale and an early form of such Maxwell-Boulogne scale is described for example, in either the British patent specification No. 247,158 or the United States patent specification No. 1,633,623.

In scales of this type and as at present in use, the delivery and discharge valves to and from the weigh tank are generally in vertical alignment and directly connected together by a central rod so that as the delivery valve opens the discharge valve closes, and vice versa. The extent to which a valve is opened depends upon and is limited to the corresponding stroke of the weigh tank in a weighing operation. Thus, the time taken by the scale for each weighing operation depends largely on the speed in which the liquor enters and is discharged from the weigh tank and which, in turn, is controlled by the amount of valve opening, i. e. the distance through which the valve is moved away from its seating. Consequently, if this distance is increased in relation to the available stroke of the weigh tank, a corresponding reduction in time may be obtained in the filling and subsequent discharge of the liquor being weighed to and from the weigh tank.

Therefore, the primary object of this invention is to obtain a substantial increase in the opening movement of the delivery and discharge valves, relative to the available valve-operating stroke of the weigh tank, by the provision of improved valve-actuating means which enable the valves to be more widely opened than has hitherto been possible with the same degree of scale movement.

Thus, an important feature of the present invention consists in a scale of the type set forth in which the delivery valve or the discharge valve or both is or are a lift valve or valves and is or are mechanically operated by movement of the weigh tank through a lever system to achieve a relatively large lift. This is especially desirable when dealing with highly viscous liquids.

According to the present invention a lever is pivoted to a fixed fulcrum and connected at spaced points to the lift valve and to the weigh tank, the connection to the weigh tank being nearer to the fulcrum of the lever than the connection to the lift valve so that a given degree of movement of the weigh tank will produce a larger movement of the valve.

The term "lift valve" is used herein to indicate a valve which is wholly raised from its seat by a linear or substantially linear motion in contradistinction to flap or pivoted valves whose opening movement necessarily involves angular displacement of the valve relatively to the valve seat.

The additional effect required in producing a larger valve opening movement absorbs a larger proportion of the strictly limited available power which is provided solely by the gravity-actuated weigh tank.

Therefore, a further object of this invention is to simplify and thereby reduce the frictional losses of the buffer arrangement of the weigh beam of the scale in order to compensate for the additional power absorbed in obtaining the larger valve opening movement before referred to.

Thus, another feature of this invention consists in the provision of a single double-acting piston type buffer, preferably an oil filled piston type buffer, for buffering the motion of the weigh beam as it reaches its terminal positions. It is contemplated that the use of this single double-acting buffer will approximately halve the frictional losses existing with the buffering arrangement at present embodied in this particular type of scale and which usually consist of two hydraulic single-acting hydraulic buffers, one adjacent each end of the weigh beam. Moreover, the power absorbed by the single double-acting buffer is capable of being regulated and can be reduced to a minimum. There is thus no danger of the scale being unable to effect the requisite operation of the valves.

Preferably the weigh beam is capable of a limited degree of unrestrained motion relative to the double-acting buffer and for this purpose the head of the piston rod extending from the cylinder of the buffer may be connected through a lost motion connection with a buffer lever which may carry spaced abutments thereon on opposite sides of the main balance or weigh beam, that is to say, above and below the weigh beam so that the weigh beam can move without buffer restraint between the abutments over a limited portion of its pivotal path of travel.

The arm of the said buffer lever may be linked to a crank of a wiper shaft for actuating customary accessories of the scale, such as counter, sampling and liming mechanisms if provided, at each weighing operation.

It is also usual for the weigh tank of such scales to discharge the liquor directly into a relatively large receiver or factory tank and it is also usual for a predetermined quantity of chemical reagent such, for example, as milk of lime, to be fed directly into the receiver as the weigh tank discharges into the receiver during each weighing operation.

This mode of supplying the reagent to the liquor discharged from the weigh tank may be inadequate, especially when dealing with highly viscous liquids, in view of the accelerated operation of the scale resulting from the larger valve openings provided by this invention.

Therefore, another object of this invention is to provide improved means whereby the operation of mixing a suitable chemical reagent with the discharged liquor will be more rapidly effected in order to keep pace with the corresponding more rapid passage of the liquor through the weigh tank during each weighing operation.

Thus, a further feature of the invention consists in the provision of a mixing device adapted to receive and conduct a discharge from the weigh tank into the receiver and also to receive and conduct the charge of chemical reagent whereby to ensure that the reagent is well mixed with the liquid during its passage to and before entry into the receiver.

The mixing device of the present invention may consist of a funnel-like member beneath the discharge valve in the weigh tank communicating with a descending duct which may consist of a vertical cylindrical conduit having therein baffles or devices for changing the direction of flow of the discharging liquid. The baffles may, for example, consist of a succession of helices of successively opposite hand.

A further feature of the present invention consists in the provision of a shield for the valve controlling the inlet of liquid to the weigh tank and in the guidance of the shield by a parallel motion linkage controlled by a float suspended in the weigh tank.

According to the present invention the shield is supported by a pair of parallel links from a fixed support, the upper of the parallel links being longer than the lower and connected at its free end to the connection suspending the float.

This mode of guiding the shield obviates any tendency to wobble and thus ensures accurate sealing contact of the shield, when lowered upon its seating surface.

The invention may also embody a sampling device which includes a relatively small tiltable liquid container located above a larger liquid container, the smaller liquid container being adapted normally to overflow to one side of the larger container and to be periodically tilted so as to discharge therefrom into the larger container.

The invention is further described with reference to the accompanying drawings which illustrate one embodiment of the invention by way of example and in which:

Fig. 3 is a partial vertical section of the lower portion of Fig. 2 with certain parts removed and showing the delivery and discharge valves in closed and open positions, respectively, as for the discharging of the weigh tank.

Fig. 4 is a sectional detail elevation showing a form of automatic sampling apparatus incorporated in the scale, and Fig. 5 is a similar elevation showing a form of automatic reagent supply device, also incorporated in the scale, for the supply of a predetermined quantity of chemical reagent to the weighed liquid during its discharge from the weigh tank, whilst Fig. 6 is another detail elevation of a form of counter mechanism also embodied in the scale for registering the number of weighing operations thereof.

Figure 1:
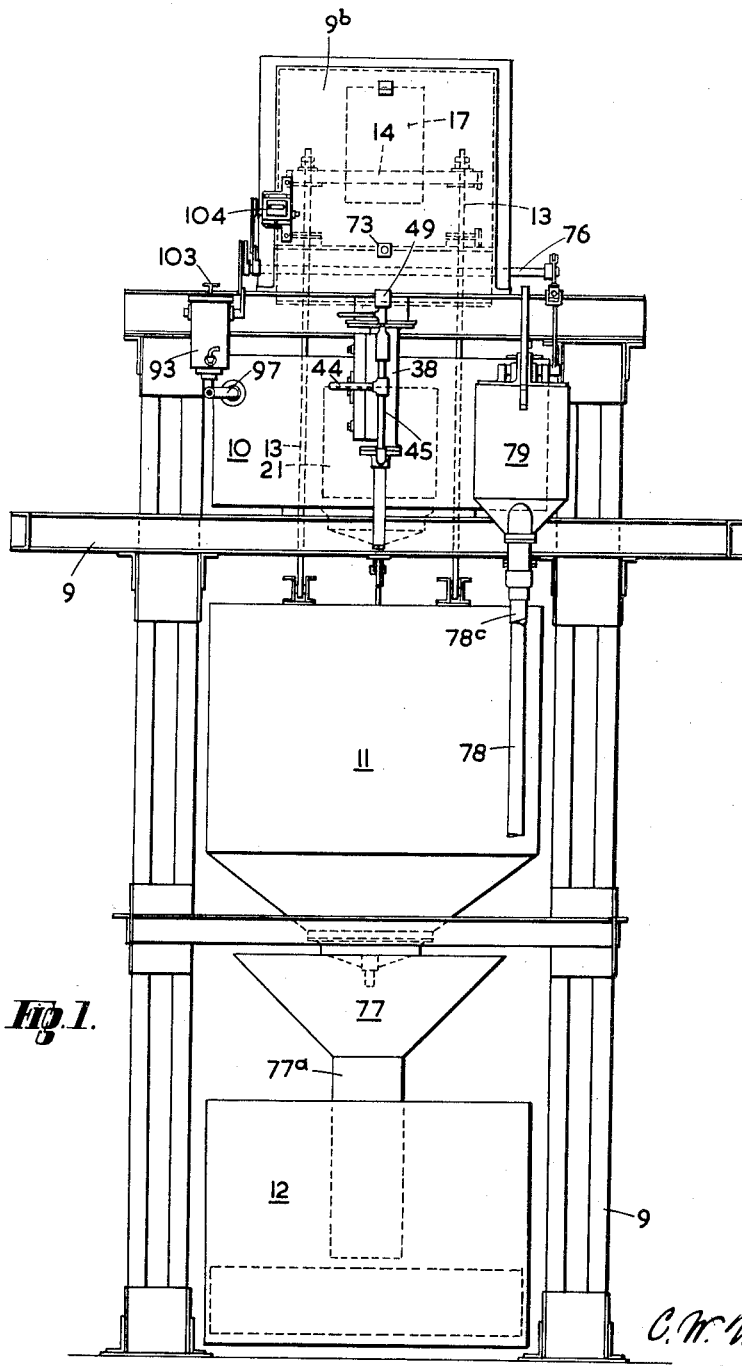
Fig. 1 is a front elevation showing the general arrangement of the scale.
Figure 2:
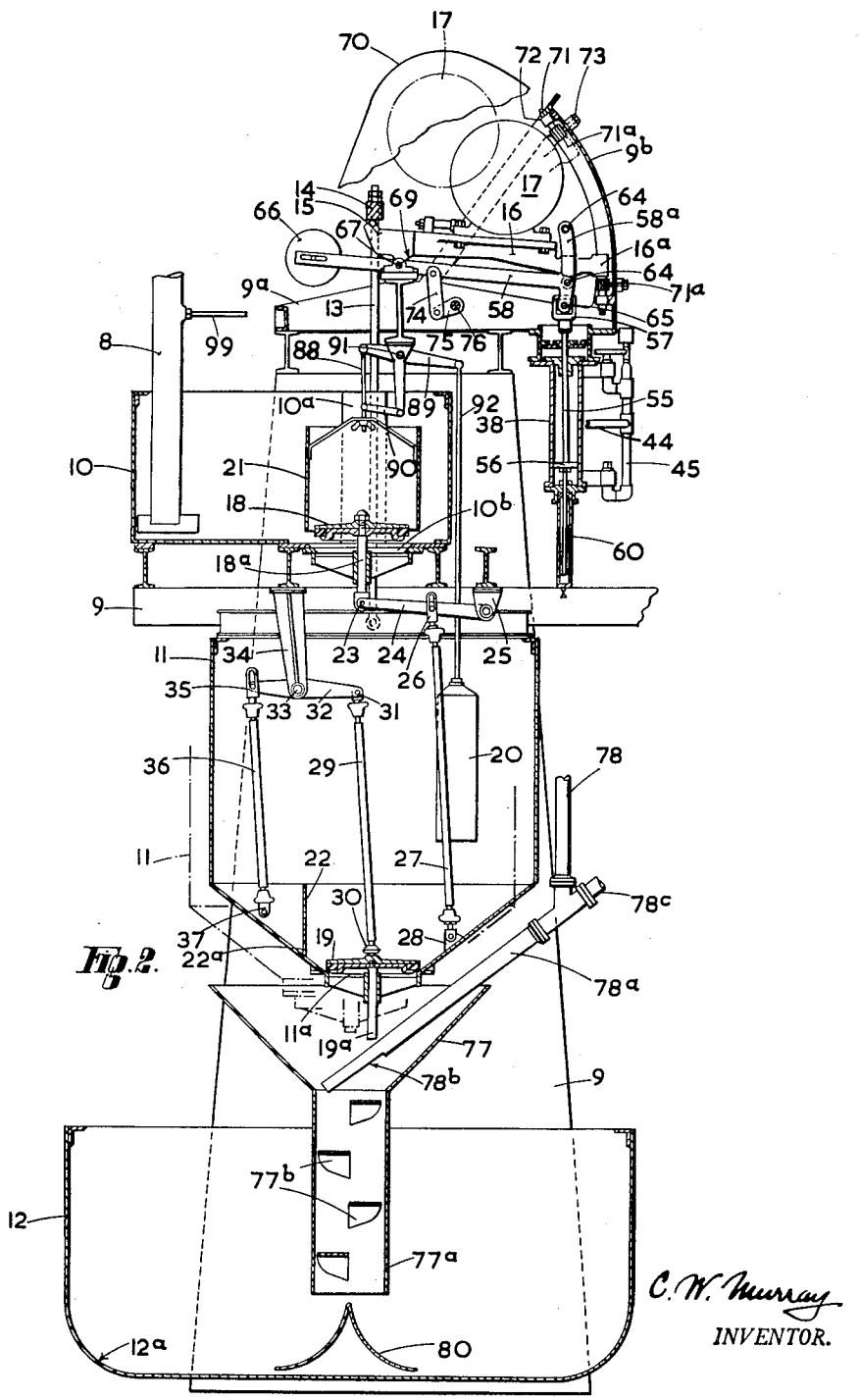
Fig. 2 is a corresponding side sectional elevation, the delivery and discharge valves to and from the weigh tank being shown in open and closed positions, respectively, as at the commencement of a charging or weighing operation.

Fig. 7 is a part-sectional elevation showing the construction of the single double-acting buffer arrangement shown in Figs. 1 and 2 and drawn to an enlarged scale as compared therewith.

Fig. 8 is a corresponding part-sectional elevation, taken at right angles to Fig. 7, of the control side of the buffer arrangement.

Fig. 9 is a plan view of the scale corresponding to Figs. 1 and 2, certain parts being removed for clarity.

Since the general arrangement and operation of the scale shown in Figs. 1 and 2 of the drawings is similar to that of the previously mentioned Maxwell-Boulogne scale, which is well known to those skilled in the art, it is only thought necessary to give a brief account of the general arrangement and operation of the scale; thus the following description will first of all describe the scale briefly and thereafter will be more particularly directed to the parts of the scale with which this invention is concerned.

The scale embodies a fabricated frame generally designated 8, an upper stationary supply tank 10 supported by frame 9, an intermediate movable weigh tank 11 and a lower receiver or factory tank 12. The weigh tank 11 is suspended by a pair of side links 13 connected to a cross bar 14 which rests on a suspension knife edge of one arm 15 of a main balance lever or weigh beam 16 which carries an adjustable counterweight 17. The suspension links 13 pass through respective oval tubes 10a fixed within and extending through supply tank 10.

With the scale in the filling or charging position as shown in Figs. 1 and 2, wherein the counterweighted weigh beam 16 has raised the empty weigh tank 11 to cause a delivery lift valve 18 to be held open above the seating of an outlet opening 10b provided in the base of the supply tank 10, and a discharge lift valve 19 to be held closed upon the seating of a discharge opening 11a provided in the base of the weigh tank 11, the liquid to be weighed passes from the source of supply, by way of an inlet pipe 8, to the tank 10, through the open valve 18 thereof and into the weigh tank 11. The liquid flows rapidly into the weigh tank 11 until the desired weight is almost reached, whereupon a float 20, which has risen with the liquid in the weigh tank 11, causes a screen or shield 21 having a serrated lower edge (not shown) to be lowered around the open valve 18 in the tank 10. This has the effect of allowing only a small flow of liquid to dribble through the delivery valve, via the serrations in the bottom edge of shield 21, to the weigh tank 11, until the desired weight has been obtained. The weigh tank 11 then over-balances the counterweighted weigh beam 16 and sinks to its discharging position, as shown in chain dotted lines in Fig. 2, so as to cause simultaneous opening of the discharge valve 19 in the weigh tank and closing of the valve 18 in the supply tank, as shown in Fig. 3. The float 20 falls with the level of the liquid, as the same discharges from the weigh tank 11, to cause the shield 21 to rise clear of the valve 18 preparatory to the next weighing operation.

The weigh tank 11 empties quickly until all the liquid is discharged except for a small quantity trapped by a baffle plate 22 and which trickles through an opening 22a in the baffle plate before leaving the weigh tank 11, via the discharge valve 19. This slow or metered flow of liquid continues until the weigh tank reaches the desired tare weight, whereupon the counterweight 17 causes the weigh beam 16 to over-balance in the other direction and raise the weigh tank 11 with its tare back to the filling or charging position.

An important feature of this invention consists in operating the delivery and discharge valves 18, 19, respectively, in such a manner that a substantial increase in the opening movement of the valves, relative to the available valve-operating stroke of the weigh tank 11, is obtained, thus enabling the valves to be more widely opened than has hitherto been possible with the same speed of scale movement.

This feature is especially desirable when dealing with highly viscous liquids, such as some kinds of sugar liquors, and is achieved by lever and link arrangements, shown in Figs. 2 and 3, which operatively connect the respective valves 18, 19 to the weigh tank 11 in a manner now to be described: Valve 18 in the supply tank 10 has a depending vertically guided stem 18a which is pivoted at 23 at its lower end to one end of a substantially horizontally disposed lever 24 which is pivoted at its other end to a fulcrum bracket 25 fixed to frame 9. At a point nearer to fulcrum 25 than to the valve stem pivot 23, the lever 24 is provided with a pivot pin which engages in a slotted coupling 26 secured to the upper end of a link or rod 27 which extends downwardly and is pivotally anchored at its lower end to a bracket 28 fixed to the base of the weigh tank 11.

The discharge valve 19 with its guide stem 19a is pivotally suspended by a link or rod 29, one end of which is pivotally connected at 30 to valve 19 and the other end is pivotally connected at 31 to one end of another substantially horizontal lever 32. Lever 32 is pivoted at 33 to a fulcrum bracket 34 fixed to the frame 9 and its other free end carries a pivot pin which engages in a slotted coupling 35 at the end of a further link or rod 36 which extends downwardly and is pivotally anchored at 37 to the base of the weigh tank 11.

It will thus be seen that in the case of both valves 18, 19, the connection at 26 or 35 of each lever 24 or 32 to the weigh tank 11 is nearer to the fulcrum 25 or 33 of the lever than is the lever connection 23 or 31 to the valve 18 or 19 so that the limited degree of movement or stroke of the weigh tank 11, when moving from its charging to discharging position or vice versa, will produce a larger movement or stroke of the valves, whilst the pin and slot connections 26, 35 between the rods 27, 36 and the respective levers 24, 32 will permit a small amount of lost motion between the parts sufficient to ensure the requisite seating of the valves.

The adidtional work in producing such larger valve opening movement absorbs a larger proportion of the strictly limited available power which is provided solely by the gravity actuated weigh tank 11. Therefore, a further important feature of this invention consists in the provision of a simplified buffer arrangement for the weigh beam 16 of the scale which is designed to reduce frictional losses, in order to compensate for the additional power absorbed in obtaining the aforesaid larger valve-opening movement.

According to this invention, this is achieved by the provision of a single double-acting piston type buffer which includes—see more particularly Figs. 7 and 8—a cylinder 38 containing a piston 56 which divides the cylinder into two working or dash-pot chambers 38a, 38b. One side of the exterior of the cylinder 38 is formed with a flat mounting area 38c, Fig. 8, which provides a seating for a cover 39 secured in position by bolts 40. The inner face of the cover is provided with a recess or channel 41 within which is housed a baffle plate 42. The thickness of the baffle plate is somewhat less than the depth of the recess or channel 41 whilst its width and length is such as to provide a working clearance between it and the sides and ends of the recess 41. A series of axially spaced port openings 43 is provided in the middle of the flat area 38c of the wall of the cylinder 38 in registering alignment with the recess or channel 41 in cover 39, said openings 43 terminating a short distance from each end of the cylinder.

Secured in the middle of cover 39 is a flanged end 44a of a fluid circulating branch pipe 44 which communicates with the cover recess or channel 41 via an opening 39a provided in the cover. The other end of pipe 44 leads into another fluid circulating pipe 45 at a point about midway its ends. The opposite ends of pipe 45 communicate with the respective ends 38a, 38b of cylinder 38 via respective cylinder connections 46, 47. A non-return valve 48, or 48a, such as a ball valve, is interposed between each of the cylinder connections 46, 47 and the ends of the pipe 45, said valves being adapted to be alternately opened by suction created in one or the other of the cylinder ends 38a, 38b, in accordance with the direction of the stroke of the double-action piston 56. The upper end of pipe 45 is fitted with a filling cup 49, for filling the system with a working fluid, such as oil, and with a return branch pipe 50 which leads into a sump 51 provided with a dust and splash cover 52.

The ends of cylinder 38 are closed by respective end caps 53, 54. A piston rod 55 carrying the piston 56 extends through end cap 53 and has a slotted head or eye member 57 screwed on to its upper end for connection with a lever 58 which is adapted to be actuated by the weigh beam 16, as shown in Fig. 2. A splined tail end 59 of piston 56 operates in a tubular cover 60 screwed into end cap 54 and depending downwardly therefrom, being fitted at its lower end with a drain plug 61.

When during a weighing operation, the piston 56 is raised by the buffer lever 58 from its position shown in Figs. 7 and 8, the non-return valve 48a will open, under suction effect, and the other non-return valve 48 will remain closed. Thus the working fluid in the cylinder 38 above piston 56 is caused to circulate through the port openings 43, around the baffle plate 42, through pipe 44 and the lower part of pipe 45, valve 48a, connection 47 and into the lower end 38b of the cylinder.

In the downward or return stroke of piston 56 caused by reverse actuation of the buffer lever 58, valve 48 opens, under suction effect, valve 48a closes and the working fluid below the piston flows through the port openings 43, around baffle 42, through pipe 44, upper part of pipe 45, valve 48, connection 46 and into the upper end 38a of the cylinder.

It will be appreciated that the buffering action of buffer lever 58 connected with piston rod 55 is dependent upon the rate of flow of the working fluid through the cylinder openings 43 and which is controlled by the baffle plate 42. Such rate of flow of the working fluid to and from the cylinder is mainly determined by the space or gap existing between the baffle plate 42 and into the coincident face of the cylinder wall containing the port openings 43. This space or gap may be varied, in order to adjust the buffering action of the piston 56, by inserting distance washers or shims 62 of the required thickness under the heads of bolts 63 screwed through the cover plate 39 so that their inner ends serve as abutments for engagement with the respective ends of the baffle plate 42, as shown in Fig. 8.

It will also be appreciated that as the piston 56 passes its midway position in cylinder 38, when moving to one or other end of the cylinder, its movement will be increasingly retarded as it moves past each port opening 43. When the piston nears its end position and eventually passes the last opening 43, the working fluid in this closed end of the cylinder becomes blocked and further movement of the piston prevented. Thus the cushioning or buffering action afforded by the piston to the buffer lever 58, and so to the weigh beam 16, is greatest when the piston 56 reaches one or other of its terminal positions in the cylinder 38.

The weigh beam 16 supporting the weigh tank 11 is capable of a limited degree of unrestrained movement relative to the buffer lever 58 connected with the double-acting piston 56 and in this connection a reduced tail end 16a of the weigh beam 16 passes between segmental extensions 58a of a pair of side links wherefrom the buffer lever 58 is fabricated. Abutments 64, such as rollers, are carried between said extensions 58a and are spaced apart one above and one below the tail end 16a of the weigh beam 16 so that the latter can move without buffer restraint between the abutments 64 over a limited part of its pivotal path of travel. The lower ends of the segmental extensions 58a carry therebetween a similar roller 65 which engages in the slot of the piston rod head member 57 whereby buffer lever 58 is operatively connected with the double-acting piston 56. The other end of lever 58 carries an adjustable counterweight 66 adapted to compensate for the weight of the parts of the single double-acting buffer. The buffer lever 58 extends below the weigh beam 16 and pivots about a fulcrum pin 67 disposed between spaced seatings 68 for corresponding knife edges 69 of the weigh beam 16, the axis of fulcrum pin 67 coinciding with the fulcrum point of the knife edges 69, as shown in Figs. 2 and 9.

The fulcrum pin 67 and knife edge seating 68 are carried by an upper frame part 9a of the main frame 9 and which is formed with an arcuate extension 9b provided with a cover, a part of which being indicated at 70 in Fig. 2. Said arcuate extension 9b carried spaced stops for engagement with the extremity of the tail end 16a of the weigh beam 16 so as to limit the total path of travel thereof.

As shown in Fig. 2, these stops, which may assist in the calibration of the scale, consist of screw-threaded spindles or calibration jacks 71 and 71a adjustably carried by brackets 72 at the extremities of an arcuate frame portion 9b, said spindles 71 carrying cylindrical head members 71a having equidistantly spaced V-notches or serrations extending axially around the exterior thereof for engagement with the pointed ends of set screws 73 for locking the screwthreaded stops or jacks 71 in any position of angular adjustment to vary the pivotal stroke of the weigh beam 16.

The arm of the buffer lever 58 connected to the piston rod is linked at 74 to a crank 75 of a wiper shaft 76 for actuating customary accessories of the scale, such as the counter, sampling and liming mechanisms later described, at each weighing operation.

It is also usual for the weigh tank 11 of such scales to discharge the liquor directly into a relatively large receiver or factory tank and it is also usual for a predetermined quantity of chemical reagent such, for example, as milk of lime, to be fed directly into the receiver as the weigh tank discharges into the receiver during each weighing operation.

This mode of supplying the reagent to the liquor discharged from the weigh tank 11 may not, especially when dealing with highly viscous liquids, be commensurate with the larger valve openings provided by this invention and which enable the liquor to pass through the scale more rapidly, thus shortening the time of a weighing operation.

Therefore, another object of this invention is to provide improved means whereby the operation of mixing a suitable chemical reagent with the discharged liquor will be more rapidly effected in order to keep pace with the corresponding more rapid passage of the liquor through the weigh tank 11 during each weighing operation.

Thus, a further feature of the invention consists in the provision of a mixing device adapted to receive and conduct a discharge from the weigh tank 11 into the receiver 12 and also to receive and conduct the charge of chemical reagent whereby to ensure that the reagent is well mixed with the liquid during its passage to and before entry into the receiver 12.

In the example illustrated, such a mixing device is shown embodied in Fig. 2 and consists of a funnel-like member 77 supported beneath the discharge opening 11a in the weigh tank 11 and communicating with an integral descending duct which consists of a vertical cylindrical conduit 77a having therein baffles or devices, such as 77b, for changing the direction of flow of the discharging liquid. The baffles may, for example, consist of a succession of helices of alternative pitch.

A supply pipe 78 from a reagent supply tank 79 extends downwardly at a side of the framework of the scale and has a sloping branch 78a which enters the funnel 77 to terminate above the uppermost baffle of the series of baffles 77b. The lower end of branch 78a is cut away at 78b to provide an outlet directly in the path of the liquid discharging from the weigh tank 11. A further branch pipe 78c can be used for cleaning or the addition of a secondary reagent if required.

The conduit 77a terminates slightly above the peak of a cone-like liquid-deflecting or spreading element 80 located in the liquid receiver 12 so that the mixture discharging from the conduit 77a impinges on said element 80 to assist in the dispersal of the mixture in the receiver. Said element 80 is preferably in the form of a cone, as shown, formed by generators which are concavely curved. The receiver is also concavely curved at 12a where the walls merge into the floor, also to assist in the dispersal of the mixture in the receiver.

Automatic discharge of a predetermined quantity of chemical reagent from the supply tank 79 is effected at each weighing operation of the scale by any suitable or known form of valve actuating mechanism, such as that shown more or less diagrammatically in Fig. 5, wherein a valve 81 is timed to open an outlet opening in the base of tank 79 each time the buffer lever 58 of the scale over-balances in the direction to cause the weighed liquid to be discharged from the weigh tank 11. The valve 81 is operatively connected to the wiper shaft 76 by means of valve rod 82, crank 83, link 84, rod 85 and crank 86, a spring buffer being provided at 87 to absorb excess movement of the wiper shaft 76. As shaft 76 is rocked in a clockwise direction by buffer lever 58 through link 74 and crank 75, crank 86 pushes rod 85 to cause valve rod 82 to raise the valve 81 off its seat to allow a charge of the reagent to flow through pipe 78 for mixing with the weighed liquid as before described.

A further feature of the present invention consists in the provision of the shield 21 for the valve 18 controlling the inlet of liquid to the weigh tank 11 and in the guidance of the shield by a parallel motion linkage controlled by the float 20. The shield is usually suspended from the end of a single float-operated lever and itself has already been used in scales of this type. It is also usually of cylindrical form with a serrated lower edge so that when the shield lies in its lowermost position on the base of the supply tank 10 and surrounding the valve 18, it allows a dribble or metered flow of liquid through the valve, when the latter is in its open position, so that as the weigh tank 11 becomes nearly charged the float 20 will cause the shield to lower to reduce the flow to a dribble and thereby facilitate an accurate weighing operation.

According to the present invention a central rod 88 suspending the shield 21 is supported—see Fig. 2—by a pair of parallel links 89, 90 from a fixed fulcrum support 91, the upper link 89 being longer than the lower and pivotally connected at its free end to a connection 92 suspending the float. This mode of guiding the shield 21 obviates any tendency to wobble and thus ensures accurate sealing contact of the shield, when lowered upon its seating surface.

A particular form of sampling device embodied in the scale is shown more particularly in Fig. 4 and consists of a tank 93 having a partition 94 therein defining a sample collector container 95 on one side of the partition while the space 96 on the other side of the partition is connected to a drain pipe 97 leading back to supply tank 10. A tiltable container 98 is disposed immediately above the partition 94 and immediately below a continuously discharging sample outlet 99a of a feed pipe 99 and so that the sample outlet discharges partly into the space 96 and partly into the tiltable container 98 which, when full, will overflow to the space 96 of the tank which is connected to the drain 97. The tiltable container 98 is connected through a linkage 100 with a crank 101 on the wiper shaft 76 of the scale so that it is tilted every time the weigh tank 11 discharges and thus a sample is discharged into the larger sampling collector 95 of the sampling tank 93 corresponding to each discharge of the weigh tank.

The feed pipe 99 to the sampling device is taken from the main feed pipe 8—see Fig. 2—leading to the supply tank 10 and a discharge connection 102 from the sampling collector 95 may lead to the supply tank 10 and the drain 97 as shown. Periodic drainage of unwanted samples may be effected by raising a valve rod 103 to open the discharge connection 102.

Fig. 6 shows a counter 104 secured to the frame part 9b for visually recording the number of weighing operations. The counter 104 may be of any known type and is connected through a linkage 105 and crank 106 to wiper shaft 76 so that it is actuated at each weighing operation of the scale.

I claim:

1. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, a fixed fulcrum above the weigh tank, a lever pivoted on said fulcrum and to said delivery valve and a weigh tank connected link pivoted to the lever at a point nearer the fulcrum than the distance between the fulcrum and the connection with the delivery valve to move the said valve bodily relative to its seat a greater distance than the travel of the weigh tank.

2. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, a fixed fulcrum above the weigh tank, a lever pivoted on said fulcrum, a link connecting the lever with the weigh tank, and a second link connecting the discharge valve with a point on the lever at a greater distance from the fulcrum than the distance between the fulcrum and said first link, to move the said discharge valve a greater distance than the travel of the weigh tank.

3. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums above the weigh tank, a lever pivoted on one fulcrum and to said delivery valve and a link pivotally connecting the weigh tank to the lever at a point nearer the fulcrum than the distance between the fulcrum and the connection with the delivery valve, a second lever pivoted on the second fulcrum, a second link connecting the second lever with the weigh tank, and a third link connecting the discharge valve with a point on said second lever at a greater distance from the said fulcrum than the distance between the fulcrum and said tank connected link to move the said valves bodily relative to their seats for greater distances than the travel of the weigh tank.

4. In a liquid weighing scale of the type set forth having a weigh tank suspended from a counterweighted weigh beam and disposed below a stationary supply tank, a vertically guided valve in the base of the supply tank serving as a delivery valve to the weigh tank and a vertically guided valve in the base of the weigh tank serving as a discharge valve therefrom, said delivery and discharge valves being adapted to be actuated by the up and down movement of the weigh tank so that in the charging position thereof the delivery valve is open and the discharge valve closed and in the discharging position of the weigh tank the delivery valve is closed and the discharge valve open, the combination of a guide stem extending downwardly from the delivery valve, a stationary fulcrum, a first lever having one end pivoted to said fulcrum and the other end pivoted to the lower end of said guide stem, an anchorage on the weigh tank, a link rod having one end pivotally connected to said anchorage and its other end pivotally connected to said lever at a point nearer to said fulcrum than to said guide stem pivot, whereby to ensure that the delivery valve is caused to move through a distance greater than the stroke of the weigh tank, a second stationary fulcrum, a second lever pivoted at a point between its ends to said second fulcrum, a second link rod having one end pivoted to an end of said second lever and its other end pivoted to the top of said discharge valve whereby the latter is suspended by said second link rod, a second anchorage on said weigh tank, a third link rod having one end pivoted to the other end of said second lever and its other end pivoted to said second anchorage, the pivotal connection of said third link rod to said second lever being nearer to said second fulcrum than the pivotal connection of said second link rod to said second lever, whereby to ensure that the discharge valve is caused to move through a distance greater than the stroke of the weigh tank and whereby to effect simultaneous opening of the discharge valve and closing of the delivery valve, or vice-versa, during a fall or rise of the weigh tank as the case may be.

5. In a liquid weighing scale according to claim 4, a pivot pin on each lever, a slotted coupling on the end of each of said first and third link rods and engaging a respective pivot pin whereby to permit a small amount of lost motion between the first and third link rods and the respective levers sufficient to ensure the requisite seating of the delivery and discharge valves.

6. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums above the weigh tank, a lever pivoted on each fulcrum, one of said levers being connected to the delivery valve and the other lever being connected to the discharge valve, a link pivotally connecting the weigh tank to each lever at a point nearer its fulcrum than the distance from the said fulcrum to the connection with the valve, and a single double-acting piston type retarder connected with the weigh beam, the said retarder comprising a cylinder, a piston dividing the cylinder into two variable working chambers, end caps for the cylinder, a piston rod having an extension through one of said caps, and a loose connection between the piston rod and the weigh beam for enabling the latter to have unrestrained motion in its initial travel in each direction.

7. In a liquid weighing scale according to claim 6, a secondary counterbalanced lever having one end directly connected to the end of the piston rod extending from the buffer cylinder and indirectly connected through said lost motion connection to said weigh beam.

8. In a liquid weighing scale according to claim 7, an adjustable counterweight at the other end of said secondary counterbalanced lever for compensating for the weight of the parts of the buffer.

9. A liquid weighing scale according to claim 7, in which the lost motion connection between the secondary lever and weigh beam includes an end extension of said secondary lever, spaced abutments carried by said end extension and disposed one above and the other below the weigh beam so that the same can move without buffer restrain over a limited movement of its pivotal path of travel determined by the spacing of said abutments.

10. In a liquid weighing scale according to claim 9 a roller on the extension of the secondary counterbalanced lever and located below said abutments and a slotted head on the end of the piston rod extending from the buffer cylinder engaging said roller.

11. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums, a lever pivoted intermediately its ends to each fulcrum, a link from one end of each lever to one of said valves, a link from the other and relatively shorter end of each lever to the weigh tank for effecting opening and closing movements of the valves in excess of the movement of the said tank, and a single double-acting piston type buffer linked to the weigh beam for retarding the motion thereof as it approaches either of its terminal positions.

12. A liquid weighing scale according to claim 11 in which the single double-acting buffer embodies a cylinder, a piston dividing the cylinder into two working chambers, end caps closing the respective ends of the cylinder, a piston rod extending from the piston through one of said caps, means connecting the piston rod to said weigh beam for buffering the motion thereof, a closed circuit fluid supply line communicating with the outer ends of said cylinder, an outlet connection leading from the cylinder at a point midway its ends and communicating with said supply line, a non-return valve in the supply line interposed between said outlet connection and each end of the cylinder, said valve being adapted to open under suction caused by the stroke of the buffer piston for diverting the fluid in the circuit from one side of the piston to the other.

13. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums, a lever pivoted intermediately its ends to each fulcrum, a link from one end of each lever to one of said valves, a link from the other and relatively shorter end of each lever to the weigh tank for effecting opening and closing movements of the valves in excess of the movement of the said tank, a single double-acting piston type buffer linked to the weigh beam for retarding the motion thereof as it approaches either of its terminal positions, said single double-acting buffer embodying a cylinder, a piston dividing the cylinder into two working chambers, end caps closing the respective ends of the cylinder, a piston rod extending from the piston through one of said caps, means connecting the piston rod to said weigh beam for buffering the motion thereof, a closed circuit fluid supply line communicating with the outer ends of said cylinder, an outlet connection leading from the cylinder at a point midway its ends and communicating with said supply line, a non-return valve in the supply line interposed between said outlet connection and each end of the cylinder, said valve being adapted to open under suction caused by the stroke of the buffer piston for diverting the fluid in the circuit from one side of the piston to the other, a series of axially spaced port openings extending through the wall of the cylinder, a cover secured to an outer face of the cylinder which coincides with said port openings, a pressure control chamber formed in said cover and surrounding said port openings, an opening in said cover connecting said control chamber to said outlet connection, and a baffle plate in said control chamber for controlling the rate of flow of the circulating fluid from the cylinder through said series of port openings, control chamber and outlet connection.

14. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weigh tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums, a lever pivoted intermediately its ends to each fulcrum, a link from one end of each lever to one of said valves, a link from the other and relatively shorter end of each lever to the weigh tank for effecting opening and closing movements of the valves in excess of the movement of the said tank, a single double-acting piston type buffer linked to the weigh beam for retarding the motion thereof as it approaches either of its terminal positions, a series of axially spaced port openings extending through the wall of the cylinder, a cover secured to an outer face of the cylinder which coincides with said port openings, a pressure control chamber formed in said cover and surrounding said port openings, an opening in said cover connecting said control chamber to said outlet connection, a baffle plate in said control chamber for controlling the rate of flow of the circulating fluid from the cylinder through said series of port openings, control chamber and outlet connection, said series of port openings being arranged in relation to the cylinder such that the movement of the buffer piston within the cylinder is increasingly retarded as it passes from its midway position towards one or other ends of the cylinder so that when the piston nears one or other of its terminal positions and eventually passes an end port opening of the series of openings, working fluid in this end of the cylinder becomes blocked and further movement of the piston prevented.

15. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weight tank, a counterweighted weigh beam, said weight tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums, a lever pivoted intermediately its ends to each fulcrum, a link from one end of each lever to one of said valves, a link from the other and relatively shorter end of each lever to the weight tank for effecting opening and closing movements of the valves in excess of the movement of the said tank, a single double-acting piston type buffer linked to the weigh beam for retarding the motion thereof as it appproaches either of its terminal positions, a series of axially spaced port openings extending through the wall of the cylinder, a cover secured to an outer face of the cylinder which coincides with said port opening, a pressure control chamber formed in said cover and surrounding said port openings, an opening in said cover connecting said control chamber to said outlet connection, a baffle plate in said control chamber for controlling the rate of flow of the circulating fluid from the cylinder through said series of port openings, control chamber and outlet connection, said series of port openings terminating some distance from each end of the cylinder such that the movement of the buffer piston within the cylinder is increasingly retarded as it passes from its midway position towards one or other ends of the cylinder so that when the piston nears one or other of its terminal positions and eventually passes an end port opening of the series of openings, working fluid in this end of the cylinder becomes blocked and further movement of the piston prevented.

16. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weight tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, two fixed fulcrums, a lever pivoted intermediately its ends to each fulcrum, a link from one end of each lever to one of said valves, a link from the other and relatively shorter end of each lever to the weigh tank for effecting opening and closing movements of the valves in excess of the movement of the said tank, and a single double-acting piston type buffer linked to the weigh beam for retarding the motion thereof as it approaches either of its terminal positions, a series of axially spaced port openings extending through the wall of the cylinder, a cover secured to an outer face of the cylinder which coincides with said port openings, a pressure control chamber formed in said cover and surrounding said port openings, an opening in said cover connecting said control chamber to said outlet connection, a baffle plate in said control chamber for controlling the rate of flow of the circulating fluid from the cylinder through said series of port openings, control chamber and outlet connection, and means for presetting the position of the baffle plate in relation to the series of port openings for the purpose of regulating the rate of flow therethrough of the circulating fluid.

17. In a liquid weighing scale of the type described, the combination of a stationary supply tank having an outlet opening provided with a valve seat, a lift valve adapted to be lifted and lowered bodily from and to said seat to open and close said outlet opening, said lift valve serving as a delivery valve to a weight tank, a counterweighted weigh beam, said weigh tank being suspended from the beam and disposed below the supply tank, said weigh tank having a discharge opening provided with a valve seat, a lift valve adapted to be lifted and lowered bodily from and to said seat to open and close said discharge opening, said lift valve serving as a discharge valve from the weigh tank, a fixed fulcrum above the weigh tank, a lever pivoted on said fulcrum, a link connecting the lever with the weigh tank, a second link connecting the discharge valve with the lever for opening the valve by downward movement of the beam and the weigh tank, a mixing device below the discharge valve, means for supplying liquid reagent to the mixing device and control means actuated by downward movement of the beam for releasing the supply of reagent to the mixing device.

18. A weighing scale according to claim 17 in which the mixing device consists of an open topped funnel-like member located beneath the discharge valve in the weigh tank and having a communicating descending duct, and a series of baffles in said duct adapted to change the direction of flow of the liquid passing through the duct.

19. In a liquid weighing scale according to claim 17, a receiver tank disposed below the weight tank, a cone-like liquid spreading element located in the receiver tank so that the mixture discharging from the mixing device impinges on said element to assist in the dispersal of the mixture in said receiver tank.

20. A liquid weighing scale according to claim 20, in which said series of baffles consists of a succession of helices of successively opposite hand.

21. In a liquid weighing scale of the type described, the combination of a stationary supply tank having a lift valve serving as a delivery valve, a counterweighted weigh beam, a weight tank suspended from the beam and disposed below the supply tank, a lift valve serving as a discharge valve from the weigh tank, a fixed fulcrum above the weigh tank, a lever pivoted on said fulcrum and to said delivery valve and a weigh tank connected link pivoted to the lever, a shield surrounding said delivery valve, a float in the weigh tank and parallel motion linkage between said shield and float.

22. A liquid weighing scale according to claim 21 in which the shield is vertically guided and supported by a pair of parallel links from a stationary fulcrum, the upper of the parallel links being extended beyond the fulcrum at one end and connected to the connection suspending the float.

23. In a liquid weighing scale of the type set forth the combination of a stationary supply tank having a delivery valve, a counterweighted weigh beam, a weigh tank suspended from the beam and disposed below the supply tank, a discharge valve from the weigh tank, linkage between said weigh tank and said valves for accelerated movement, a single double-acting piston type buffer, a secondary counterbalanced beam operative between said buffer and weigh beam for buffering the motion thereof as it approaches either of its terminal positions, means directly connecting the piston of said buffer to an end of said secondary counterbalanced beam, means forming a lost motion connection between this end of the secondary counterbalanced beam and said weigh beam whereby the latter is capable of a limited degree of unrestrained motion relative to the buffer, an upward extension from an upper frame part of the scale, spaced apart stops carried by said frame extension for co-operation with said weigh beam whereby to limit the total path of travel thereof.

24. A liquid weighing scale according to claim 23 in which said stops are adjustable and consist of screw-threaded spindles adjustably carried by brackets disposed one at each end of the said frame extension, cylindrical head members carried by said spindles and formed with equidistantly spaced V-notches extending axially therearound, and set screws for engagement with said notches for locking the stops in a selected position of adjustment.

25. A liquid weighing scale according to claim 23 in which said upper frame part of the scale carries spaced seatings for knife edges of the weigh beam and the fulcrum for the secondary counterbalanced lever, said fulcrum being disposed between said spaced seatings and so that its axis is in alignment with the knife edge supporting points of said spaced seatings.

26. In a liquid weighing scale of the type set forth the combination of a stationary supply tank having a delivery valve, a counterweighted weigh beam, a weigh tank suspended from the beam and disposed below the supply tank, a discharge valve from the weigh tank, linkage between said weigh tank and said valves for accelerated movement, a single double-acting piston type buffer, a secondary counterbalanced beam operative between said buffer and weigh beam for buffering the motion thereof as it approaches either of its terminal positions, means directly connecting the piston of said buffer to an end of said secondary counterbalanced beam, means forming a lost motion connection between this end of the secondary counterbalanced beam and said weigh beam whereby the latter is capable of a limited degree of unrestrained motion relative to the buffer, an upward extension from an upper frame part of the scale, spaced apart stops carried by said frame extension for cooperation with said weigh beam whereby to limit the total path of travel thereof, a wiper shaft for actuating customary accessories of the scale, such as counter, sampling and liming devices, at each weighing operation of the scale, a crank on said shaft and a link connecting said crank to said secondary counterbalanced lever.

27. A liquid weighing scale according to claim 26 in which a sampling device consists of a tank, a partition therein defining a sample container at one side and a compartment at the other, a tiltable container disposed immediately above said partition, a main feed pipe supplying the stationary supply tank of the scale with the liquid to be weighed, a constantly open sample-discharge outlet leading from said main feed pipe and terminating immediately above said tiltable container, a drain leading from said compartment to the supply tank, valve means between the sample container and drain for emptying the container when required, and a linkage between said tiltable container and wiper shaft, the arrangement being such that the tiltable container, when filled by said sample-discharge outlet, will overflow to that side of the partition open to the drain, and, when tilted at each weighing operation through its connection with the wiper shaft, will discharge its contents into the larger sample container, thus obtaining samples of the liquid corresponding to each discharge of the weigh tank.

28. In a liquid weighing scale of the type set forth, the combination of a counterweighted main balance beam, a weigh tank suspended from the beam, a lift valve serving as a discharge valve from the weigh tank, linkage between said weigh tank and said valve for accelerated movement, means for supplying a charge of chemical reagent at each weighing operation of the tank including a wiper shaft operatively connected to the main balance beam, a mixing device disposed below said discharge valve to receive discharge from the weigh tank and simultaneously a charge of reagent, a supply tank for the reagent, a branch pipe leading from the reagent supply tank and terminating above the mixing device, valve means in the reagent supply tank for controlling the supply therefrom to said branch pipe, and means operatively connecting said valve means to said wiper shaft to cause the valve means to open in timed sequence with each discharge of weighed liquid from the weigh tank.

References Cited in the file of this patent

UNITED STATES PATENTS

| | | |
|---|---|---|
| 756,681 | Moldenhaver | Apr. 5, 1904 |
| 1,112,636 | McNeill | Oct. 6, 1914 |
| 1,191,484 | Thorschmidt | July 18, 1916 |
| 1,321,862 | Turner | Nov. 18, 1919 |
| 1,337,842 | Lambertz | Apr. 20, 1920 |
| 1,600,917 | Williame | Sept. 21, 1926 |
| 1,633,623 | Boulogne | June 28, 1927 |
| 1,978,558 | Van der Horst | Oct. 30, 1934 |
| 2,050,131 | Skreta | Aug. 4, 1936 |
| 2,055,214 | Christianson | Sept. 22, 1936 |
| 2,097,522 | Hanique | Nov. 2, 1937 |
| 2,270,083 | Rapp | Jan. 13, 1942 |

FOREIGN PATENTS

| | | |
|---|---|---|
| 93,849 | Sweden | Dec. 20, 1938 (pub.) |